INVENTOR.
CECIL S. PRESENZ
BY Roland A. Anderson
ATTORNEY

Oct. 4, 1955

C. S. PRESENZ 2,719,941

RECIPROCATING MOTOR CONTROL FOR
AUTOMATIC CUT-OFF APPARATUS

Filed July 11, 1951

INVENTOR.
CECIL S. PRESENZ

BY
Roland A. Anderson

ATTORNEY

INVENTOR.
CECIL S. PRESENZ
BY
Roland A. Anderson
ATTORNEY 2,719,941

RECIPROCATING MOTOR CONTROL FOR AUTOMATIC CUT-OFF APPARATUS

Cecil S. Presenz, Berkeley, Calif., assignor to the United States of America as represented by the United States Atomic Energy Commission Application July 11, 1951, Serial No. 236,235

3 Claims. (Cl. 318—125)

The present invention relates to an automatic cut-off apparatus and more particularly to a device adapted to continuously and automatically cut selected standard lengths of a wire, ribbon, tape, rod, or the like, from a stream thereof fed at a constant speed.

Many industries use or have need for many different lengths of wire, a majority of which may be standardized for each unit to be assembled. In such circumstance production may be greatly accelerated by having the wire pre-cut to such standard lengths thereby eliminating the time-wasting motion of unreeling and cutting wire as needed. The present invention provides a simple and rapid means of cutting wire into selected lengths by providing a wire magazine from which wire is threaded through a splice or knot detector, through a guide and tension attachment, through driven rollers, to a solenoid cut-off arrangement which is actuated by a thyratron variable control circuit.

It is therefore an object of the present invention to provide a new and improved wire cutting apparatus.

Another object of the present invention is to provide an apparatus for automatically cutting standard lengths from a stream of solid material being fed at a constant speed.

A further object of the present invention is to provide a wire cutting apparatus having electronic control.

A still further object of the invention is to provide an electronically controlled apparatus for automatically cutting standard lengths of wire from a continuously flowing stream of wire.

Still another object of the invention is to provide an adjustable apparatus having electronic control for automatically cutting desired lengths of wire from a continuously flowing stream of wire.

Another object of the invention is to provide an automatic apparatus for feeding wire at a constant speed to an electronically controlled mechanism for automatically cutting the wire into predetermined lengths.

Other objects and advantages of the invention will be apparent from the following description and claims considered together with the accompanying drawing, in which:

Figures 1, 2:
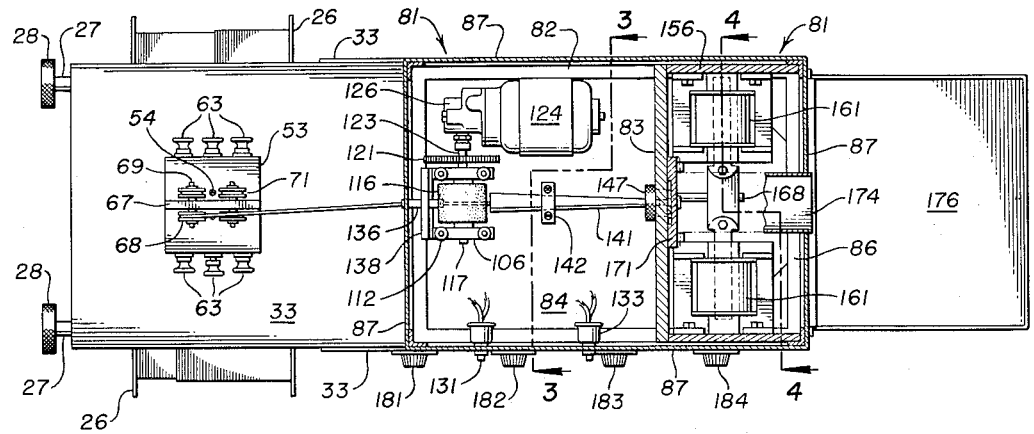
Figure 1 is an elevational view of the invention, partly in section.
Figure 2 is a plan view of the invention as illustrated in Fig. 1.

Referring to the drawing in detail, and Fig. 1 in particular, there is provided a skeleton framework 11 having an upper rectangular frame 12 mounted on at least four corner posts 13 which are supported at the corresponding corners of a similar lower frame 14. To render the apparatus mobile, four casters 16 (only one of which is illustrated) of suitable size and strength are mounted, one at each corner of the lower frame 12, by means of bolts 17. The framework 11 is divided internally into two compartments 18 and 19 by means of a pair of oppositely disposed upright members 21 mounted between the upper and lower frames 12 and 14.

One of the compartments 18 serves as a wire magazine within which a plurality of spools 26 of wire may be suitably mounted. Preferably, as illustrated in Fig. 1, each spool 26 is disposed on an axle 27 mounted between aligned bores in the corner post 13 and the upright member 21. One end of the axle 27 is provided with a knurled knob 28 and the other end with threads 29, the latter being adapted to engage a threaded hole in the upright member 21. To maintain suitable alignment of the spools 26 on the axles 27, tubular spacers 32 are disposed on the axles on either side of the spools. Since it is necessary for the purposes of the invention that the spools 26 be freely rotatable on the axles 27, it will be readily apparent that the diameter of the axle must be substantially less than the opening through the spool and that the outside diameter of the spacers 32 must be substantially greater than such spool opening. With the foregoing structure it is seen that the spools 26 are easily changed by unscrewing the axle 27 by means of the knob 28 and withdrawing the axle to free the spool, then replacing the spool, spacer, and axle.

Figure 6:
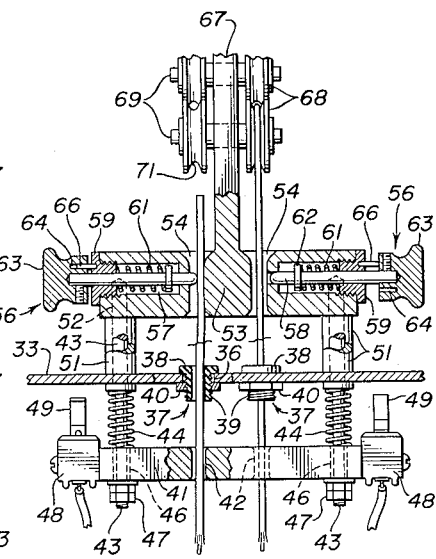
Figure 6 is a sectional view of the splice detector taken along the line 6—6 of Fig. 1.

Removable panels 33 are provided for the sides of the compartment 19 and for the entire top of the framework 11 for mounting both externally and internally disposed elements and for enclosing the chamber 19. A plurality of holes 36, equal in number to the number of spools 26, uniformly spaced in two rows about the center of the top panel 33 over the compartment 18 are provided for bringing out the wire of each spool 26. As illustrated in Fig. 6 each of the holes 36 is provided with an insert bushing 37 having a flanged upper portion 38 to engage the upper surface of the top panel 33 and a threaded lower portion 39 extended to receive a nut 40 to engage the lower surface of the top panel 33. The flanged portion 38 of each bushing is internally rounded to prevent excessive wear on wire drawn therethrough. Disposed below the top panel 33 is a plate 41 having a plurality of openings 42 therethrough with substantially the same spacing as provided for the holes 36. The plate 41 is utilized as a splice detector and as such the diameter of the openings 42 is determined by the diameter of wire of the spools 26, so that the wire normally has free passage therethrough, but any enlargement such as kinks or splices will be prevented from passing. At least four bolts 43 are extended through the top panel 33 to suspend the plate 41 in proper position so that the holes 36 and openings 42 are in alignment. The spacing between the top panel 33 and plate 41 is determined by springs 44 mounted on the bolts 43 therebetween. Suitable apertures 46 bored through the plate 41 provide for loose passage of the bolts 43 therethrough. Nuts 47 are provided to engage threaded portions of the bolts 43 to maintain the plate 41 in position and may also be used to make adjustments in the spacing between the plate 41 and the top panel 33. By selecting springs of suitable strength, it is seen that a splice in the wire will force the plate 41 toward the top panel 33. Thus, by mounting a normally closed switch 48 on each side of the plate 41 so that an actuating lever 49 of such switch extends toward the top panel 33, the switch is opened upon the occurrence of each splice in the wire reaching the plate 41. The electrical connections of the switches 48 will be described in detail hereinafter.

The bolts 43 are extended above the top panel 33 through suitable spacers 51 to engage threaded bores 52 in a plate 53 to dispose such plate parallel to the top panel. A plurality of passages 54, equal in number to the holes 36, are bored through the plate 53 in alignment with the holes 36 and openings 42. The passages 54 are substantially larger than the diameter of the wire to be drawn therethrough and both the entrance and exit portions are smoothly rounded to prevent damage to the wire. To provide means for clamping the wire in the passages 54 there are provided transversely disposed spring-mounted plungers 56 extending through cylindrical bores 57 in the plate 53. Each of such plungers 56 has a shaft 58 extended through a cap 59, which is adapted to be threaded into an enlarged outer portion of the bore 57, and extended through a smaller portion of the bore 57, which communicates with the passage 54. Within the enlarged portion of the bore 57 a spring 61 is disposed surrounding the shaft 58 and bearing at one end against the cap 59 and at the other end against a transversely enlarged portion 62 of the shaft. A knob 63 mounted on the externally projecting end of the shaft 58 has a bored out portion 64 for receiving one end of a pin 66, the other end of which is firmly affixed to the cap 59, thereby allowing the plunger 56 to clamp the wire within the passage 54. It will be readily apparent that the wire may be released by pulling the plunger 56 so that the pin 66 no longer engages the bored out portion 64, rotating the knob 63, and then releasing, thereby maintaining the shaft 58 in a retracted position away from the wire.

Mounted transversely on the plate 53 is an upright member 67 extending longitudinally thereof between the two rows of passages 54. To serve as a wire guide and tensioning means at least three wheels 68 are rotatably mounted on each side of the member 67 as illustrated in Figs. 1, 2, and 6. Three axles 69 are extended through the member 67 to rotatably support such wheels 68 and are vertically spaced apart approximately the diameter of one of the wheels with the centrally located axle offset from a line vertically extended between the other two axles. By suitably dimensioning the support structure for the wheels 68 the latter may be disposed in alignment with the passages 54. Each of the wheels 68 is preferably provided with a circumferential groove 71 to receive the wire and prevent lateral slippage.

A feed and cut-off mechanism 81 is positioned on the top panel 33 over the chamber 19. Such mechanism 81 is preferably contained within a framework 82 having the same width as the framework 11, but about half the length thereof. A partition 83 is suitably mounted transversely within the framework 82 to form a chamber 84 within which the drive mechanism is mounted and a chamber 86 within which the cut-off mechanism is mounted. Suitable closure panels 87 are removably fastened to the framework 82 including a door 88 over the drive mechanism chamber 84 which is pivotally mounted as by a hinge 89 arrangement on the top panel 87 of the cut-off mechanism chamber 86. Preferably the framework 82 is supported on the framework 11 in a vibration-free manner as by rubber shock mounts 91 suitably mounted at each corner of the framework 82 with the chamber 84 adjacent the wire guide and tensioning means previously described.

Figure 3:
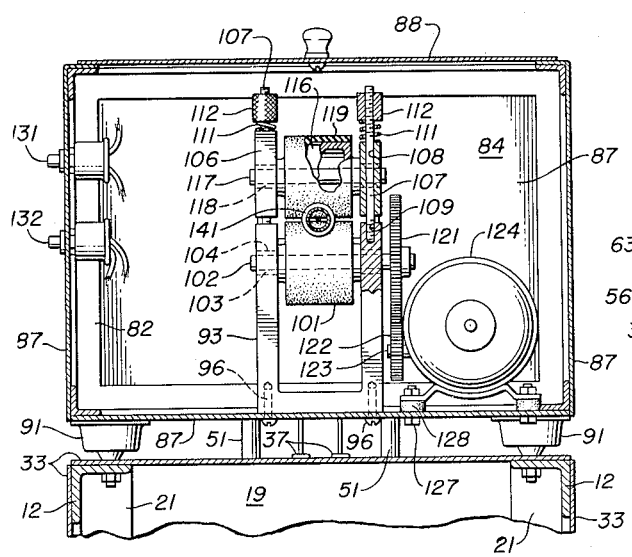
Figure 3 is a sectional view of the feed mechanism taken along the line 3—3 of Fig. 2.

Referring now to Fig. 3, there is provided a U-shaped frame 93 with the transverse portion thereof suitably mounted, as by bolts 96, on the bottom panel 87 adjacent the side panel 87 of the chamber 84. A lower roller 101 is carried on a rotatable shaft 102 extending through suitable bearings 103 mounted within aligned holes 104 in the upright legs of the U-shaped frame 93. An extension plate 106 is provided for each of the upright legs of the frame 93 and mounted thereon by means of bolts 107 extending loosely through passages 108 in the plates 106 to engage threaded holes 109 in the upright legs. To provide an adjustable tension mounting for the extension plates 106 each of the bolts 107 is provided with a spring 111 bearing against the top edge of the plates 106 and held in tension by knurled nuts 112 threaded on the bolts. An upper roller 116 is mounted on a freely rotatable axle 117 which is extended through suitable aligned bearings 118 in the opposing extension plates 106. To provide a resilient surface for each of the rollers 101 and 116 a sheet of material 119, such as rubber, is wrapped and firmly held in place about the rollers. Preferably the diameters of the rollers 101 and 116 are selected so that the surfaces thereof are in contact along a line located parallel to the axle 117 and shaft 102 and prevent the extension plates 106 from touching the upright legs of the frame 93. In this manner then the pressure between the two rollers 101 and 116 may be altered by adjusting the position of the nuts 112 on the bolts 107.

To drive the lower roller 101 a gear 121 is mounted on an extended portion of the axle 102. A second gear 122 engages the gear 121 and is mounted on a shaft 123 which is suitably driven by an electric motor 124 through a gear box 126. The motor 124 is preferably mounted on the bottom panel 87 by means of bolts 127 extending through rubber mounts 128. To control the direction of drive and to start and stop the motor 124 there are suitably mounted on one of the side panels 87 a start push button 131 and a stop push button 132 for the forward drive, and a start push button 133 and a stop push button 134 for the reverse drive. The connections between such push buttons and the motor 124 will be discussed more fully hereinafter.

Figure 5:
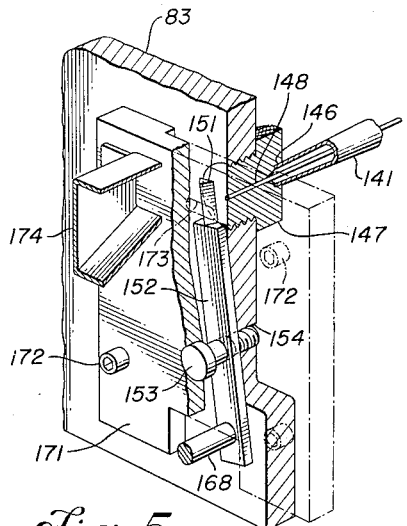
Figure 5 is an isometric view, partly in section, of the cut-off mechanism as illustrated in Figure 4.

As a means for guiding the wire to a position between the rollers 101 and 116, a tubular guide 136 projects through an aperture 137 in the side panel 87 toward the upright member 67, in alignment therewith, and extends internally of the chamber 84 substantially to the line of contact between the two rollers. The tubular guide 136 may be held in position by a suitable mounting on a support 138 affixed between the upright legs of the frame 93. Disposed on the opposite side of the rollers 101 and 116 is a conical guide 141 axially aligned with the tubular guide and having the diverging end suitably supported adjacent the rollers on a post 142 vertically mounted on the bottom panel 87. The converging end of the conical guide 141 is adapted to rest within an enlarged opening 146 (as illustrated in Fig. 5) axially bored in a threaded plug 147 of material having a hardness substantially greater than the hardness of wire. A passage 148 having substantially the diameter of the wire is continued axially through the remaining portion of the plug 147. Now with the plug 147 threaded into a tapped bore in the partition 83 so that the passage 148 is in alignment with the axis of the conical guide 141, it will be seen that wire drawn therethrough has a straight path through the driving mechanism chamber 84.

To provide for cutting wire projecting through the plug 147 a two-edged knife blade 151 is mounted at one end of a holder 152 with the blade edges flush against the plug face. The holder 152 is pivotally mounted at a point substantially midway of its length as by a bolt 153 extending through an opening therein to threadably engage a tapped opening 154 in the partition 83. It will thus be seen that, by applying a reciprocating force to the lower end of the holder 152, the knife blade 151 will be moved across the face of the plug 147 so as to traverse the passage 148 opening therein and cut wire at each traversal. To support the relatively heavy apparatus for applying such force, side plates 156 are disposed along opposite sides of the chamber 86 and rigidly mounted to the framework 82 in a suitable manner as by bolts 157. A pair of heavy duty solenoids 161 are mounted, as by bolts 162, one on each of the side plates 156 with the armatures 163 thereof in alignment and extending toward one another. A connecting bar 164 is extended between the ends of the armatures 163 and is attached thereto by means of bolts 166 and nuts 167. To translate the movements of the armatures 163 to the knife holder 152, a pin 168 mounted on the lower portion of the holder extends into a vertically disposed slot 169 cut into the adjacent face of the connecting bar 164. The electrical control circuit for the solenoids 161 will be described in detail hereinafter.

Figure 4:
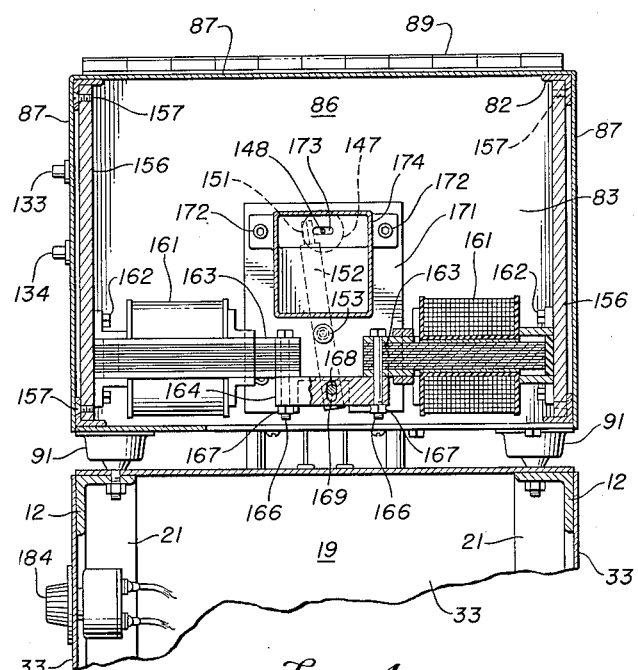
Figure 4 is a sectional view of the cut-off mechanism taken along the line 4—4 of Fig. 2.

Preferably, as illustrated in Figs. 4 and 5, a cover plate 171 is provided to partially enclose the knife holder 152 and is mounted on the partition 83 by screws 172 with an aperture 173 in alignment with the passage 148 in the plug 147. The cover plate 171 also serves as a support for a rectangular horn-shaped cut-off chute 174 which is mounted thereon at the converging end in alignment with the aperture 173 by uppermost screws 172 extending through oppositely disposed flanges. The diverging end of the chute 174 is extended through the chamber 86 and slightly therebeyond. Disposed below the extended end of chute 174 is a cut-off wire catcher 176 which is removably mounted on the end panel 33 as by hooks 177 engaging a plate 178 suitably mounted on such panel and extended slightly therebeyond.

The chamber 19 within the framework 11 serves as a cubicle for mounting the power and electronic control apparatus of the invention. Certain external controls are necessary for such apparatus and are mounted on one of the side panels 33. These external controls are preferably aligned in two horizontal rows, as illustrated in Fig. 1, and comprise in the upper row two resistor selector switches, 181, 182, the control knob of a potentiometer 183, and a capacitor selector switch 184, and in the lower row two toggle switches 186 and 187 and two indicator lamps 188 and 189. The connections to such controls will be described hereinafter. Conduits (not shown) are provided between the various chambers of the invention, as described above, to permit the required control wires to be suitably placed therebetween.

Figure 7:
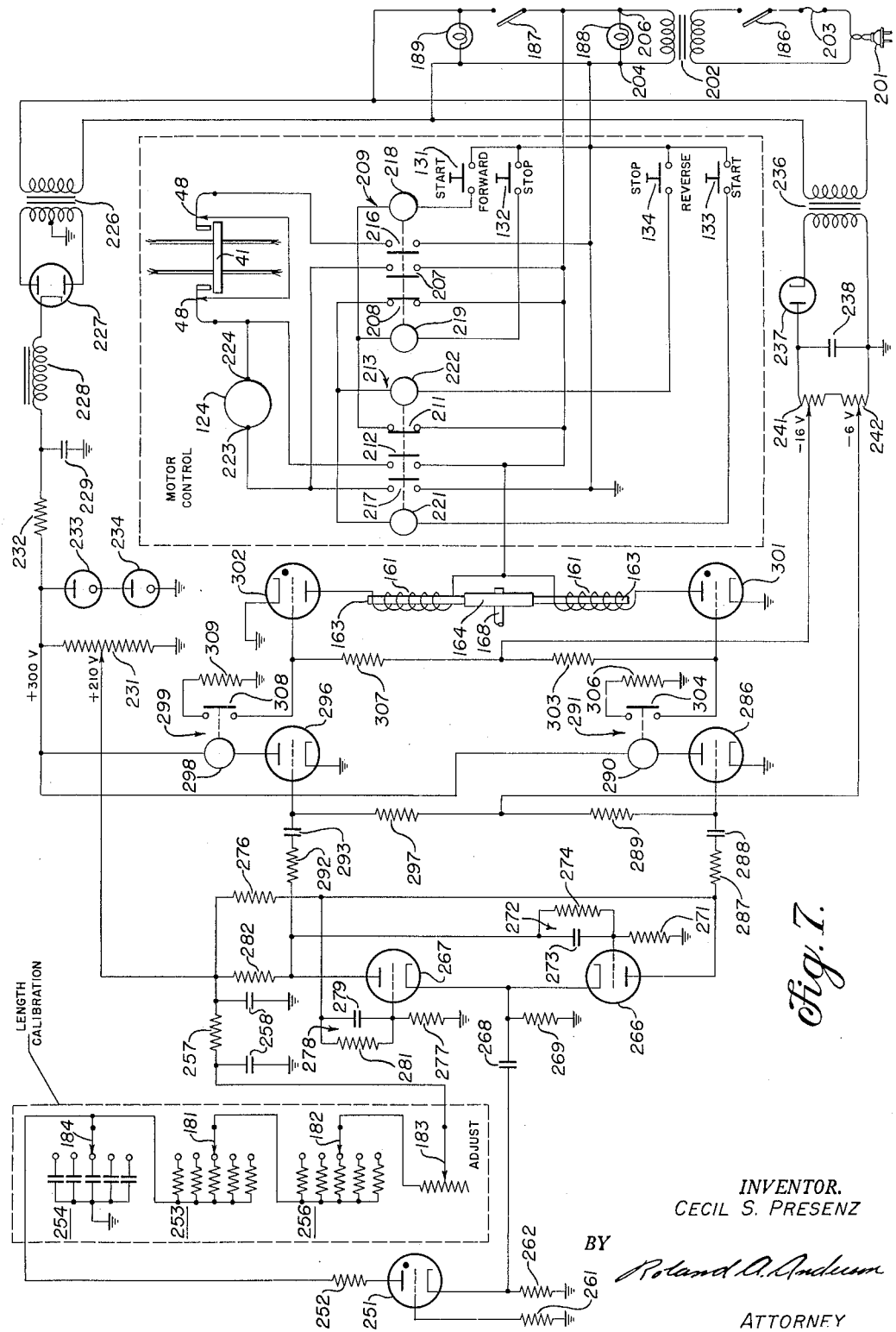
Figure 7 is a schematic wiring diagram of the control circuit for the feed motor and the cut-off mechanism of the present invention.

Referring now to Fig. 7, wherein a schematic wiring diagram of the control circuit is illustrated, it will be readily apparent that the circuit may be mounted in many different ways; however, since the manner of disposing the circuit within the framework 11 is not part of the invention, the description to follow will be limited to the circuit itself and with reference by previously designated numbers those electrical components described above. There is provided a conventional two-prong plug 201 to be inserted in any convenient outlet of commercial alternating current. Two leads from the plug 201 are connected across one winding of a transformer 202 with a protective fuse 203 and the toggle switch 186 connected in series in one of the leads. The indicating lamp 188 is connected across the other winding of the transformer 202 to indicate the position of the switch 186. One side 204 of the lamp 188 is grounded and is connected to one side of each of the forward and reverse stop and start switches 131, 132, 133, and 134, respectively. The other side 206 of the lamp 188 is connected to one side of each of a normally open contactor 207 and a normally closed contactor 208 of a "forward" starting relay 209 for the motor 124. The same side 206 of the lamp 188 is further connected to one side of each of a normally closed contactor 211 and a normally open contactor 212 of a "reverse" starting relay 213. A further connection is also made from the side 204 of the lamp 188 to one side of a normally open contactor 216 of the forward relay 209 and to one side of a normally open contactor 217 of the reverse relay 213. To provide energization of the forward relay 209 the start switch 131 is connected to a first solenoid 218 of the relay while the stop switch 132 is connected to a second solenoid 219 of the relay. The other side of each of the solenoids 218 and 219 are interconnected and further connected to the contactor 211 of the reverse relay 213. Energization of the reverse relay 213 is similarly provided by connecting a first solenoid 221 to the start switch 133, a second solenoid 222 to the stop switch 134, interconnecting the other side of each solenoid to the contactor 208 of the forward relay 209. The motor 124 connections are made from one side 223 thereof to the contactor 207 and to the contactor 217 and from the other side 224 thereof to the contactor 212. The side 224 of the motor is also connected to one of the switches 48 which is connected in series with the other switch 48, which in turn is connected to the contactor 216.

From the foregoing connections it will be seen that a series path may be followed from the side 204 of the lamp 188 through the forward start switch 131, the solenoid 218 of the forward relay 209, and the normally closed contactor 211 to the other side 206 of the lamp 188. Connected in parallel with the start switch 131 and the solenoid 218 is the series-connected stop switch 132 and the solenoid 219. A similar path may be followed through the reverse switches 133 and 134, the solenoids 221 and 222 of the reverse relay 213 and the normally closed contactor 208 of the forward relay 209. It will also be seen that a path may be traced from the side 204 of the lamp 188 through the normally open contactor 216 of the forward relay 209, the series-connected switches 48, the motor 124 winding from the side 224 to the side 223, and the normally open contactor 207 to the side 206 of the lamp 188. Another path may be traced from the side 204 of the lamp 188 through the normally open contactor 217 of the reverse relay 213, the motor 124 winding from the side 223 to the side 224, and the normally open contactor 212 to the side 206 of the lamp 188.

When the forward start switch 131 is closed the solenoid 218 is energized to open the interlock contactor 208 in the reverse circuit and to close the contactors 207 and 216 thereby impressing an operating voltage across the motor 124. It is to be noted that the reverse relay 213 cannot now be energized because of the open contactor 208. To stop the motor 124 it is only necessary to close the stop switch 132 which opens the contactors 207 and 216 in the motor 124 circuit and closes the contactor 208 to return the relay 209 to normal condition. The reverse circuit operates in a similar manner to that outlined for the forward circuit.

One side of the switch 187 is connected to the side 206 of the lamp 188 and the other side of the switch is connected to one side of the lamp 189. The side 204 of the lamp 188 is directly connected to the other side of the lamp 189. One winding of a power supply transformer 226 is connected in parallel with the lamp 189. A double diode tube 227 is provided with the anodes thereof respectively connected to the leads of the other winding, which is center tapped and grounded, of the transformer 226 to serve as a full wave rectifier. The cathodes of the tube 227 are connected together and further connected to one end of an inductor 228 the other end of which is provided with a grounded by-pass capacitor 229. The combination of the inductance 228 and capacitor 229 serve as a smoothing filter for the rectified voltage between the cathodes of the tube 227 and the center tap of the transformer 226 winding. A voltage dividing potentiometer 231, having one end connected to ground, is connected at the other end thereof to the junction between the inductance 228 and capacitor 229 through a current limiting resistor 232. Two series-connected voltage regulator tubes 233 and 234 are connected in parallel with the potentiometer 231. Thus the potentiometer 231 may serve as a source of regulated positive unidirectional voltage with respect to ground, the adjustable arm thereof providing desired adjustability.

A second power transformer 236 is provided with a winding thereof connected in parallel with the lamp 189. One side of the other winding of the transformer 236 is connected to ground and the other side is connected to the cathode of a diode-type half-wave rectifier 237. A by-pass capacitor 238 is connected from the anode of the rectifier 237 to ground to minimize the ripple voltage and two series-connected potentiometers 241 and 242 are connected in parallel therewith. Thus the adjustable elements of the potentiometers 241 and 242 may serve as variable sources of unregulated negative unidirectional voltage with respect to ground.

To alternately energize the two solenoids 161 a pulsing circuit is provided. A relaxation oscillator utilizing a gaseous discharge tube 251 is employed as a source of pulses. The anode of the tube 251 is connected through a current limiting resistor 252 to the variable contact of the capacitor selector switch 184 and to one end of each of a plurality of resistors 253. A plurality of storage capacitors 254 each having a different value of capacitance are, respectively, connected between ground and one of the fixed contacts of the switch 184. The plurality of resistors 253 are individually connected to fixed contacts of the selector switch 181. A connection is made from the variable contact of the switch 181 to each of a second plurality of resistors 256 and the variable contact of such switch is connected to one end of the potentiometer 183. A filter network comprising a resistor 257 and capacitors 258 connected between each end thereof and ground is inserted between the adjustable element of the potentiometer 183 and potentiometer 231. Thus an operating potential is supplied to the anode of the tube 251 through a variable resistance-capacitance circuit. A control grid resistor 261 is connected between ground and the control grid of the tube 251 to maintain such grid at the proper operating potential with respect to the other tube elements. Similarly a cathode resistor 262 is inserted between ground and the cathode of the tube 251. With such connections completed it will be apparent that the positive voltage of the potentiometer 231 will cause a charging current to flow through the potentiometer 183 and the selected resistors of the plurality of resistors 253 and 256 to build up a voltage across the selected condenser of the plurality of condensers 254. The charging time of the circuit is substantially equal to the product of the circuit capacitance and resistance; therefore, it is seen that such charging time may be varied by the position of the selector switches 181, 182, and 184 in a coarse manner and that adjustment of the potentiometer 183 provides intermediate variations.

When the voltage across the selected capacitor 254 increases toward the voltage of the potentiometer 231 the conduction voltage of the tube 251 is reached and, since the voltage across the selected capacitor is impressed across the tube, the tube conducts violently to discharge the capacitor. Because of the inherent characteristics of gaseous discharge tubes, the tube 251 is cut off when the selected capacitor 254 is discharged and remains in such condition until the capacitor is again charged to the conduction voltage. From the foregoing it will be readily apparent that, by controlling the charging time of the capacitor 254, the time of conduction of the tube 251 may be controlled.

Since two cut off solenoids 161 are provided, a univibrator circuit utilizing two similar triode vacuum tubes 266 and 267, respectively, is utilized to channel one pulse to one of the solenoids and the next successive pulse to the other solenoid. Preferably the positive pulse of voltage occurring across the cathode resistor 262 of the tube 251 during conduction therein is coupled to the cathodes of the tubes 266 and 267, which are connected together, by a capacitor 268 connected therebetween. A resistor 269 is connected from the cathodes of the tubes 266 and 267 to ground to develop the voltage coupled thereto. To obtain the required univibrator action the control grid of the tube 266 is connected to ground through a resistor 271 and to the anode of the tube 267 through a coupling circuit 272 comprising a parallel-connected capacitor 273 and resistor 274 while the anode thereof is connected to the adjustable element of the potentiometer 231 through a dropping resistor 276. Similar connections of the tube 267 are necessary to complete the univibrator action of the two tubes 266 and 267 and comprise a connection from the control grid of the tube 267 to ground through a resistor 277, a connection from the control grid to the anode of the tube 266 through a network 278 comprising a parallel-connected capacitor 279 and resistor 281, and from the anode to the adjustable element of the potentiometer 231 through a dropping resistor 282. The operation of the univibrator is conventional and each positive pulse of voltage coupled from the cathode of the tube 251 results in alternate conduction in the tubes 266 and 267.

To make use of the alternately conducting state of the tubes 266 and 267, the anode of the tube 266 is connected to the control grid of a tube 286 through a limiting resistor 287 and a coupling capacitor 288. The tube 286 is normally maintained in a non-conducting state by a negative grid bias supplied by connecting a resistor 289 between the control grid and the adjustable element of the potentiometer 242. The cathode of the tube 286 is directly connected to ground and the solenoid 290 of a relay 291 is connected between the anode of the tube and the point of positive voltage existing at the junction of the potentiometer 231 and the resistor 232. It is thus seen that the tube 286 serves as a switch to operate the relay 291 each time the tube conducts which, in turn, depends upon the conductive state of the tube 266.

A similar arrangement is provided to operate from the anode of the tube 267 by connecting a limiting resistor 292 and coupling capacitor 293 in series between such anode and the control grid of a triode switch tube 296. The control grid of the tube 296 is further connected to the negative voltage at the adjustable element of the potentiometer 242 through a resistor 297 to normally maintain the tube cut off. A connection is made directly from the cathode of the tube 296 to ground while the solenoid 298 of a relay 299 is connected between the anode of such tube and the point of positive voltage at the junction between the potentiometer 231 and resistor 232. Thus there has been provided two relays 291 and 299 which are responsive to the alternate conduction of the tubes 266 and 267 of the univibrator circuit.

The windings of the heavy duty solenoids 161 are connected in series and the junction therebetween is connected to the side 206 of the indicating lamp 188. One end of the series-connected solenoids is connected to the anode of a first triode type gaseous discharge tube 301 while the other end of the solenoids is connected to the anode of a second triode type gaseous discharge tube 302. The cathode of each of the tubes 301 and 302 is directly connected to ground. To control the conduction of the tube 301 the control grid thereof is connected to the negative voltage of the adjustable element of the potentiometer 241 through a resistor 303 and to one terminal of a normally open contactor 304 of the relay 291. The other terminal of such contactor 304 is connected to ground through a resistor 306. A similar set of connections are provided for control grid of the tube 302 by connecting a resistor 307 between the control grid and the negative voltage of the adjustable element of the potentiometer 241 and to one terminal of a normally open contactor 308, the other terminal of which is connected to ground through a resistor 309.

From the foregoing it is seen that the cut-off solenoids 161 are operated from the voltage of the alternating current of the transformer 202. Thus the contactors 304 and 308 necessarily must be closed for at least one cycle of the alternating voltage to assure operation of the solenoids 161. In order to accomplish such mode of operation the circuit prior to the contactors 304 and 308 must have a time constant equivalent to the time of one cycle of the alternating voltage and such characteristic may be suitably obtained by proper selection of the components of the univibrator or the relays 291 and 299. Grid control of the gaseous discharge tubes 301 and 302 is maintained by using alternating current to supply the cut off solenoids 161 because the anode of the tubes becomes alternately negative for half of each cycle during which extinction of current flow results to leave the tubes controlled by the grids thereof.

With the foregoing circuit connections completed the operation thereof is initiated by connecting the plug 201 into a source of commercial sixty-cycle power and closing the switches 186 and 187. The lamps 188 and 189 then glow to indicate that the circuit is energized. The selector switches 181 and 182 may then be set to select suitable resistors 253 and 256, respectively, the values of which along with the value of the capacitance of the selected capacitor 254 determine the charging time thereof. When the selected capacitor 254 becomes charged to the conduction voltage of the tube 251, the tube fires to discharge the capacitor. Such charging and discharging of the capacitor 254 is a continuous process and at each discharge the voltage at the cathode of the tube 251 is raised because of current flow through the resistor 262. Such positive pulses at the cathode of the tube 251 are coupled to the cathodes of the tubes 266 and 267 of the univibrator circuit and proportionately raise the voltage thereof. The effect of raising the voltage of the cathodes of the tubes 266 and 267 is to initiate operation of the univibrator by cutting off the conducting tube with a resultant rise in anode voltage which is coupled to the control grid of the other tube and results in the conduction thereof. Each successive positive pulse of voltage at the cathodes of the tubes 266 and 267 has a similar effect in that the tubes are alternately rendered conducting. Thus each time one of the tubes 266 or 267 changes from a conducting to a nonconducting state a positive pulse of voltage occurs at the anode of the tube.

By coupling the positive voltages at the anodes of the tubes 266 and 267, respectively, to the control grid of the tubes 286 and 296 these tubes are rendered conductive in an alternate manner. A current flow through the tube 286 actuates the relay 291 in the anode circuit thereof to close the contactor 304. As stated previously the circuit is arranged so that the contactor 304 remains closed for a period equivalent to a cycle of the voltage of the alternating current cycle which in this instance is one-tenth of a second. During the interval that the contactor 304 is closed the control grid of the tube 301 is connected to ground through the resistor 306 which results in current flowing from ground through the resistors 306 and 303 to the voltage dividers 241 and 242. The effect of such current flow is to raise the normal potential of the control grid of the tube 301 from a negative value toward ground potential and thereby change the condition of the tube so that conduction will occur when the alternating current at the anode becomes positive. It will then be readily apparent that with the foregoing conditions satisfied the tube 301 conducts causing current to flow through the cut off solenoid 161 which establishes a magnetic field therein to move the armature 163 and thereby cause the knife blade 151 to traverse across the face of the plug 147.

A similar action to that just described occurs when current flows through the tube 296. Thus the relay 299 is actuated to close the contactor 308 which places the tube 302 in an operable state. Upon occurrence of the positive portion of the cycle of the alternating current the tube 302 conducts causing the other cut off solenoid 161 to move the armature 163 thereof and return the knife blade 151 to its original position. Since the knife blade 151 is double edged, there is a cutting action each time the blade 151 is moved to traverse the face of the plug 147.

Considering the apparatus as completely assembled, it will be seen that a plurality of spools of wire 26 of desired size may suitably be mounted within the chamber 18 as a wire magazine. The loose wire end of each spool 26 may be threaded through the openings 42 in the plate 41, through the bushings 37, and through the passages 54. Those wires which are to serve as a stand-by supply are clamped in the passages 54 by the respective plunger 56 while one of the wires is appropriately trained over the lower wheel 68, around the centrally located wheel, and then around the upper wheel. From this latter position about the upper wheel 68 the wire is extended toward the feed and cut-off mechanism 81 and through the tubular guide 136. From the guide 136 the wire is extended between the lower and upper rollers 101 and 116, respectively, through the conical guide 141, and through the passage 148 in the plug 147. It is to be noted that the passage 148 of the plug 147 should have substantially the diameter of the wire which is threaded therethrough so that the wire is firmly held during the cutting operation. Such requirement necessitates the provision of a plurality of such plugs 147 having passages 148 of various diameters for the different wires it is desired to cut into lengths. When other than wire is to be cut the passage 148 should have substantially the cross-sectional dimensions of the other material.

Now with the wire so entrained, the value of resistance and capacitance of the oscillator circuit may be set by means of the knobs on the side panel 33. Next, the switches 186 and 187 may be turned to the on position to energize the electrical circuit and obtain suitable movement of the knife blade 151. The motor 124 may now be started by pressing the forward start button 131 which actuates the relay 209 to impress a voltage across the motor. Since the lower roller 101 is powered by the motor 124 through the gears 121 and 122, the roller turns to draw wire from the spool 26 in the chamber 18 to force the wire in a continuously moving stream through the passage 148 in the plug 147. Thus each time one of the solenoids 161 becomes energized by action of the electrical circuit the knife blade 151 traverses the face of the plug and severs the wire. The cut lengths of wire fall into the chute 174 which guides such lengths into the wire catcher 176. If, at any time during operation of the apparatus, the wire coming from the spool 26 is knotted or spliced, such knot or splice will catch at the lower face of the plate 41 and thereby force the plate upward. Such upward motion trips one of the switches 48 which opens the circuit of the motor 124 until the fault is cleared.

It will be readily apparent that a variable speed motor and a constant rate oscillator could easily be substituted for the constant speed motor 124 and the variable rate oscillator. The remainder of the apparatus would remain unchanged in such case.

With the motor 124 rotating the roller 101 so that wire is played out at a constant rate of thirty-one feet per minute it is possible to obtain cut sections of wire of thirty-one feet by adjusting the oscillator circuit so that pulses therefrom occur at the rate of one per minute. With the limitation, as set forth above, the shortest length of wire which may be cut when the wire is moving at the rate of thirty-one feet per minute will be .31 inch. Thus the present invention may be used to cut lengths of wire from less than one inch to many feet in length.

It is to be noted that the conical guide 141 provides space for a slight bowing of the wire during the cut off operation. Since it is impossible in the present embodiment of the invention to cut wire without impeding the progress thereof, it is necessary to make provision for wire played out during the time the knife blade 151 blocks the passage 148 and for pliant material the enlarged portion of the conical guide 141 is adequate. Should it be desired to adapt the principles set forth herein for cutting rod or other rigid material, it will be readily apparent that a simple additional circuit may be used which is responsive to the oscillator pulses to disable the motor during the cutting time.

While the salient features of the present invention have been described in detail with respect to one embodiment it will, of course, be apparent that numerous modifications may be made within the spirit and scope of this invention and it is therefore not desired to limit the invention to the exact details described as may be defined in the following claims.

What is claimed is:

1. In a circuit for alternately energizing a pair of electromagnets, the combination comprising a first and a second electromagnet connected in series, a pair of triode gaseous discharge tubes having anodes respectively connected to said electromagnets, alternating current supply means connected between the common junction of said electromagnets and respective cathodes of said discharge tubes, a variable electronic oscillator for generating pulses of voltage, a univibrator circuit connected across the output of said oscillator and having two outputs of opposite polarity, and circuit means respectively connected between the outputs of said univibrator and control grids of said discharge tubes whereby said tubes conduct alternately at a rate determined by said oscillator.

2. In a circuit for alternately energizing a pair of electromagnets, the combination comprising a first and a second electromagnet connected in series, a pair of triode gaseous discharge tubes having anodes respectively connected to said electromagnets, an alternating current source connected between the common junction of said electromagnets and respective cathodes of said discharge tubes, a free-running electronic oscillator having means included for altering the frequency thereof, a univibrator circuit connected to the output of said oscillator and having two outputs of opposite phase, and circuit means respectively connected between the outputs of said univibrator and control grids of said discharge tubes whereby said discharge tubes conduct alternately to alternately energize said electromagnets at a rate determined by said oscillator.

3. In a circuit for alternately energizing a pair of electromagnets, the combination comprising a first and second electromagnet connected in series, a pair of triode gaseous discharge tubes having anodes respectively connected to said electromagnets, an alternating current source connected between the common junction of said electromagnets and respective cathodes of said discharge tubes, bias means connected between control grid and cathode of each of said discharge tubes for rendering such tubes nonconductive, a free-running electronic oscillator having means included for altering the frequency thereof, a univibrator circuit connected across the output of said oscillator and having two outputs of opposite phase, circuit means connected to one of the outputs of said univibrator and including a first relay coil, similar circuit means connected to the other output of said univibrator and including a second relay coil, each of said relay coils having an associated normally open contact individually connected in series with a resistor between control grid and cathode of each of said discharge tubes whereby said electromagnets are alternately energized at a rate determined by said oscillator.

References Cited in the file of this patent

UNITED STATES PATENTS

| | | |
|---|---|---|
| 344,819 | Eckerson | July 6, 1886 |
| 432,565 | Ritchie | July 22, 1890 |
| 871,532 | Stanton | Nov. 19, 1907 |
| 1,259,968 | Edwards | Mar. 19, 1918 |
| 1,934,997 | Singer | Nov. 14, 1933 |
| 1,974,262 | Cobe | Sept. 18, 1934 |
| 1,998,069 | Bentel | Apr. 16, 1935 |
| 2,091,522 | Perry | Aug. 31, 1937 |
| 2,166,087 | Baumgartner | July 11, 1939 |
| 2,182,014 | Clark | Dec. 5, 1939 |
| 2,309,343 | Farrow | Jan. 26, 1943 |
| 2,309,755 | Davis | Feb. 2, 1943 |
| 2,319,103 | Allen | May 11, 1943 |
| 2,324,834 | Gurwick | July 20, 1943 |
| 2,441,541 | Hidzick | May 11, 1948 |
| 2,489,921 | Moore | Nov. 29, 1949 |
| 2,532,672 | Michael | Dec. 5, 1950 |
| 2,644,645 | Bevevino | July 7, 1953 |

FOREIGN PATENTS

| | | |
|---|---|---|
| 124,203 | Australia | May 22, 1947 |
| 609,758 | Great Britain | Oct. 6, 1948 |